United States Patent
Lysher

[11] 3,933,955
[45] Jan. 20, 1976

[54] PROCESS FOR PRODUCING MICROSPHERES

[75] Inventor: Wayne M. Lysher, Richland, Wash.

[73] Assignee: McDonnell Douglas Corporation, Long Beach, Calif.

[22] Filed: July 26, 1972

[21] Appl. No.: 275,236

Related U.S. Application Data

[62] Division of Ser. No. 98,975, Dec. 17, 1970, Pat. No. 3,729,278.

[52] U.S. Cl. .......................... 264/9; 264/14; 264/13
[51] Int. Cl.² ............................................. B01J 2/06
[58] Field of Search............................ 264/9, 14, 13

[56] References Cited
UNITED STATES PATENTS

| | | | |
|---|---|---|---|
| 2,968,066 | 1/1961 | Ballast et al. | 264/9 |
| 3,373,232 | 3/1968 | Wise et al. | 264/9 |
| 3,617,585 | 11/1971 | Haas | 264/14 |

Primary Examiner—Robert F. White
Assistant Examiner—J. R. Hall
Attorney, Agent, or Firm—D. N. Jeu; Walter J. Jason; Donald L. Royer

[57] ABSTRACT

Process for producing microspheres comprises immersing a lower portion of a generally vertical, sol-gel feed tube having a lower microsphere formation needle in an alcohol drying column, feeding sol-gel at a predetermined rate into the upper end of the feed tube, and vibrating the feed tube in a generally horizontal direction at a predetermined amplitude and frequency to produce microspheres from the formation needle of a uniform and predetermined size. An electromagnetic transducer drive for vibrating the feed tube is used in one illustrative embodiment of apparatus for practicing the invention, and an electric motor offset drive is used in another illustrative embodiment of such apparatus. A feed tube having multiple microsphere formation needles at its lower end can be used for producing microspheres in quantity.

9 Claims, 5 Drawing Figures

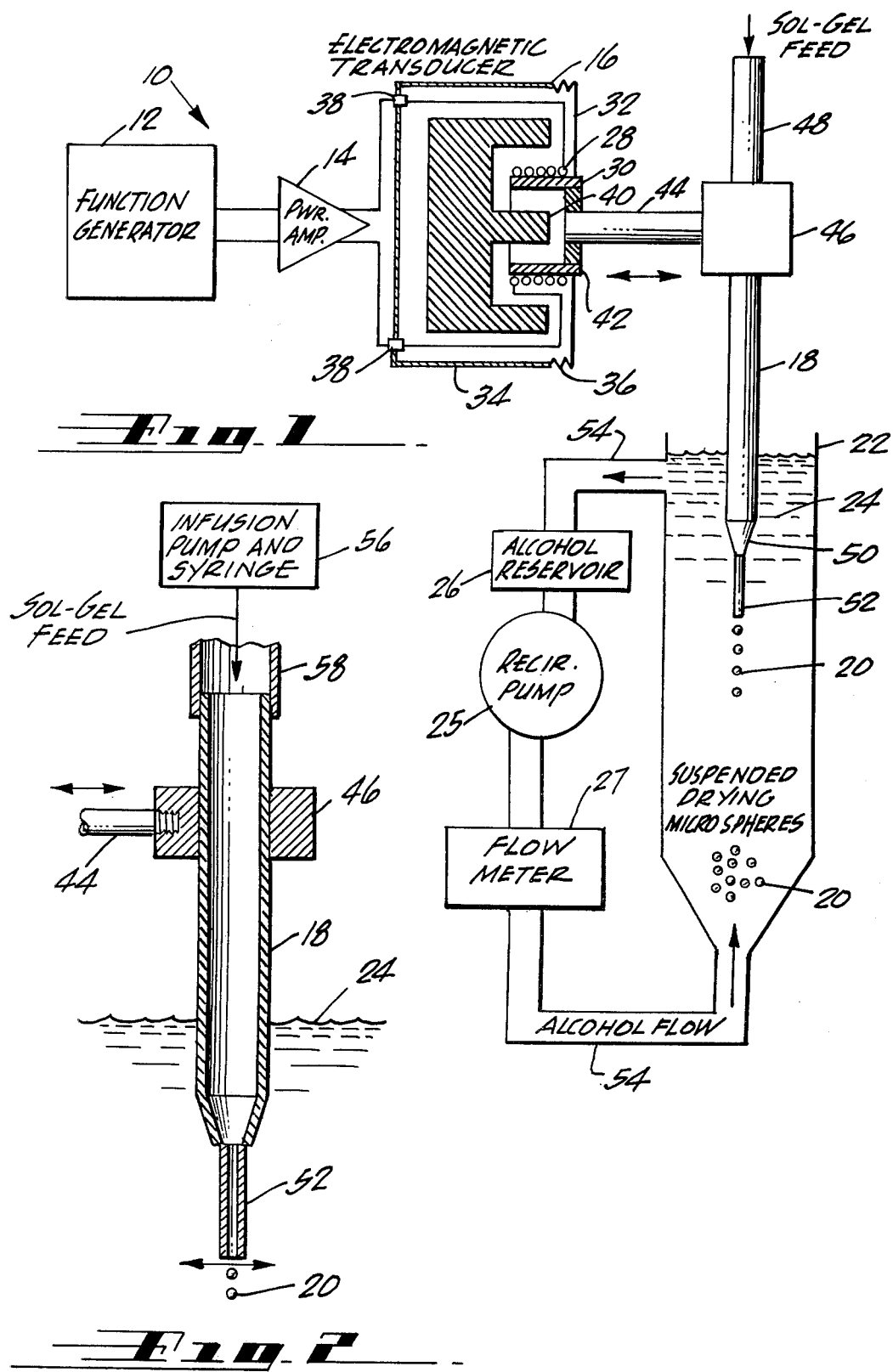

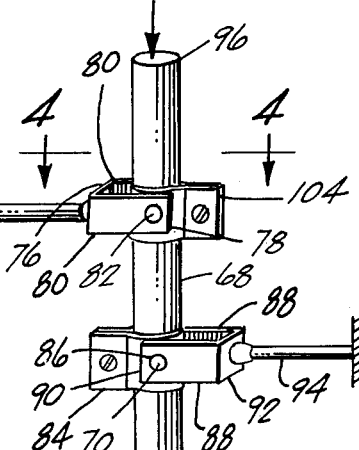
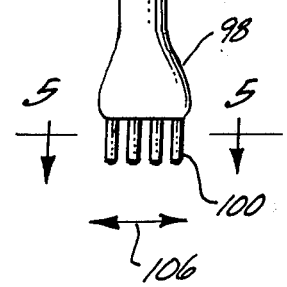
Fig. 3.
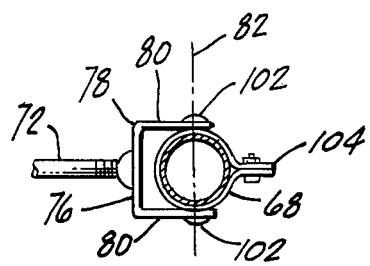
Fig. 4.
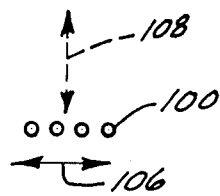
Fig. 5.

PROCESS FOR PRODUCING MICROSPHERES

This is a division of application Ser. No. 98,975 filed Dec. 17, 1970, now U.S. Pat. No. 3,729,278.

BACKGROUND OF THE INVENTION

My present invention relates generally to radioisotope microspheres. More particularly, the invention relates to a novel process and associated apparatus for rapidly and efficiently producing uniformly sized microspheres.

Radioisotope microspheres are normally formed by the sol-gel process which is a wet-chemistry technique. A starting (nitrate) compound is suitably dissolved, the metal hydroxide precipitate is washed, and crystallite (oxide) growth is controlled and concentrated by heat and evaporation. The resulting sol-gel of a suitable consistency or viscosity is formed into microspheres which are then calcined in a furnace at approximately 1500° C to achieve near-theoretical density. The sol-gel process has proven advantages including high density microsphere formation capability, reasonable economy, wide reproducible size range, and minimal airborne scattering or loss of radioactive particles.

In the conventional process of forming sol-gel microspheres, the sol-gel is fed at a flow rate according to its consistency or viscosity along with a flow of alcohol. The sol-gel is contained in an ordinary syringe mounted on an infusion pump which can be varied to drive the syringe plunger at a desired rate. The sol-gel output from the syringe is fed through a flexible tubing into a squared tip hypodermic needle, the end of the tubing being connected to the upper end of the needle by a suitably tapered connector. The tapered connector is installed in a coupling collar at the top of a relatively long microsphere formation nozzle so that the hypodermic needle is concentrically mounted and extends down within the tubular nozzle. The length of the needle is, for example, about 2 inches long and the nozzle is about 6 inches long, with the lower 1 inch of the nozzle immersed in a microsphere drying alcohol column.

The coupling collar has a laterally connecting passageway opening adjacent to the tapered wall of the tapered connector. Alcohol is fed in the passageway and flows around the tapered wall of the tapered connector and down the outside of its connected needle. The alcohol flows pass the end of the hypodermic needle and generally keeps the surrounding tubular nozzle filled with its flow. Microsphere formation is accomplished by the alcohol flow acting on the sol-gel emitted at the end of the needle. The alcohol flow inevitably fluctuates, however, and produces a considerable effect on the formation of the microspheres. Size variation is a major result and this causes a high rejection rate of unsuitably sized microspheres. Provision of a proper alcohol feed with the sol-gel feed precludes the satisfactory use of more than one needle within a microsphere formation nozzle. Thus, production of microspheres in quantity is infeasible with this equipment. The inherent static operating conditions of the equipment also account for a certain amount of the variations in sol-gel viscosity and needle plugging by the sol-gel.

SUMMARY OF THE INVENTION

Briefly, and in general terms, my invention is preferably practiced by utilizing apparatus for producing microspheres including a vertically mounted sol-gel feed tube having at least one microsphere formation needle suitably coupled to its lower end, an infusion pump having a variable drive for feeding sol-gel from its driven syringe at a predetermined rate into the upper end of the feed tube, a container providing an alcohol column in which the lower end of the feed tube is immersed, drive means for vibrating the feed tube such that the lower end of the formation needle is generally displaced horizontally at a predetermined amplitude and frequency to produce microspheres from the needle immersed in the alcohol column of a uniform and predetermined size, and a circulating pump for providing a flow of alcohol up through the container at a predetermined flow rate for suspending a quantity of drying microspheres in the alcohol column.

Uniform microspheres of a predetermined size can be produced with a fixed sol-gel feed rate according to the size of the formation needle used and its vibrated amplitude and frequency. The size of the formation needle and its vibration amplitude normally need not be changed for different production runs so that microsphere size can be essentially a function of vibration frequency. An electromagnetic transducer (Low Frequency Audio Driver) for vibrating the feed tube is used in one illustrative embodiment of the apparatus for practicing this invention, and an electric motor offset (crank) drive is used in another illustrative embodiment of such apparatus. A feed tube having multiple microsphere formation needles at its lower end can be used to produce microspheres in quantity by vibrating the needles perpendicularly to the sol-gel feed direction. The number of needles used is limited only by the feed tube size.

BRIEF DESCRIPTION OF THE DRAWINGS

My invention will be more fully understood, and other features and advantages thereof will become apparent, from the following description of two exemplary embodiments of apparatus for practicing the invention. The description is to be taken in conjunction with the accompanying drawings, in which:

FIG. 1 is a diagrammatic representation of an illustrative embodiment of the apparatus for practicing this invention wherein an electromagnetic transducer drive is used to actuate a sol-gel feed tube to produce microspheres in accordance with my invention;

FIG. 2 is a fragmentary and enlarged sectional view of the sol-gel feed tube used in the embodiment of FIG. 1;

FIG. 3 is a generally perspective view of another illustrative embodiment of the apparatus for practicing this invention wherein an electric motor offset drive is utilized to actuate a pivotally mounted sol-gel feed tube;

FIG. 4 is a fragmentary cross sectional view of the pivotally mounted sol-gel feed tube as taken along the line 4—4 indicated in FIG. 3; and FIG. 5 is another cross sectional view of the pivotally mounted sol-gel feed tube as taken along the line 5—5 indicated in FIG. 3.

DESCRIPTION OF THE PRESENT EMBODIMENTS

FIG. 1 is a diagrammatic representation of an illustrative embodiment of apparatus for practicing my invention. This embodiment utilizes an electromagnetic transducer drive and can be appropriately designated as the electromagnetic transducer microsphere production system 10. The system 10 includes a function generator 12 having an alternating current output, a power amplifier 14 for amplifying the generator output signal, an electromagnetic transducer 16 which is energized by the amplifier output signal to produce a mechanical output, a vertical sol-gel feed tube 18 which is driven (horizontally vibrated) by the transducer output to produce microspheres 20 therefrom, a container 22 providing an alcohol column 24 for receiving and drying the microspheres, and a pump 25 for circulating the alcohol at a proper flow rate for suspension of a quantity of the formed microspheres therein. An alcohol reservoir 26 and a flow meter 27 are respectively located before and after the circulating pump 25, as shown.

The function generator 12 can be, for example, a Model 202A Low Frequency Function Generator manufactured by the Hewlett Packard Company of Palo Alto, California for providing a sine wave output signal which can be adjusted in amplitude and varied in frequency. The output signal of the function generator 12 can be varied from 50 to 150 c.p.s., for example. The power amplifier 14 is conventional and can provide output power of 75 to 100 watts audio for energizing the electromagnetic transducer 16. The electromagnetic transducer 16 can be essentially an ordinary loudspeaker wherein the output signal of the power amplifier 14 is applied to speaker audio coil 28. The coil 28 is wound on and bonded to a tubular hub 30 which is attached at its right end to the periphery of a central circular opening in diaphragm 32. The radially outer periphery of the diaphragm 32 is supported by the right end of transducer casing 34 through a flexible connection 36. The ends of the coil 28 are connected to respective connectors 38 suitably mounted to the casing 34, and the output of the power amplifier 14 is connected to the connectors as shown in FIG. 1.

The tubular hub 30 is supported so that it is concentrically positioned about the cylindrical end of the permanent field magnet core 40. The right end of the hub 30 is closed normally by disc 42 which has been modified to be centrally affixed to the left end of a connecting rod 44. The right end of the connecting rod 44 is suitably affixed to clamp means 46 which directly mounts vertical sol-gel feed tube 18. The feed tube 18 includes an upper portion 48 into which sol-gel is normally fed, and a lower portion 50 which is conically tapered at its lower end to join with a hollow microsphere forming needle 52. The lower portion 50 of the feed tube 18 is immersed in the alcohol column 24 which is held in the container 22. The alcohol is circulated by pump 25 through a circulating passageway 54 at a microsphere suspension flow rate which is determined by the size of the drying column 24 and the quantity of formed microspheres 20 held in suspension. The alcohol needs to be at room temperature only, and a flow rate must be maintained to allow suspension of the formed microspheres until an adequate drying time has elapsed (about 30 minutes, for example). Some trial and error is necessarily involved in establishing the proper alcohol flow rate, of course.

FIG. 2 is a fragmentary and enlarged sectional view of the sol-gel feed tube 18 portion of the system 10 shown in FIG. 1. An infusion pump (with a variable feed rate drive) and syringe 56 designed to accommodate an ordinary syringe with sufficient sol-gel for a prolonged run time has the syringe output coupled by flexible tubing 58 to the upper end of feed tube 18. The infusion pump and syringe 56 is, for example, a Model 975 Compact Infusion Pump manufactured by the Harvard Apparatus Company of Dover, Massachusetts mounting an ordinary syringe thereon in its bracket so that the pump drive engages the syringe plunger. The feed tube 18 can have an upper portion 48 inner diameter of approximately ¼-inch and a lower portion 50 tapered length of about ⅜-inch, for example. The microsphere forming needle 52 can be a No. 22 hypodermic needle having a 1/32-inch outer diameter, a 12 to 15 mils inner diameter or bore, and a length of about ½-inch with a squared tip. The needle 52 length must not be too long (and should be less than 1 inch in length) to be adequately rigid in order to avoid any tendency towards higher harmonic frequency motions. The particular models of equipment and types of materials, and specific rates and dimensions noted above and elsewhere herein are, of course, merely given by way of example only and are not to be considered as limiting on this invention in any manner.

In operation, the function generator 12 (FIG. 1) is adjusted to provide an output signal of, for example, a frequency of 90 c.p.s. and an amplitude which produces a horizontal or lateral displacement of the needle 52 of approximately 1/16-inch total. The infusion pump (and syringe) 56 (FIG. 2) is adjusted to provide a feed rate of, for example, 46 c.c. per minute of samarium hydroxide [$Sm(OH)_3$] sol-gel. Of course, the sol-gel consistency or viscosity determines the flow rate to be provided for microsphere formation and the size is determined by needle size, displacement amplitude and frequency. It is not always possible to obtain a sol-gel solution of the same consistency; therefore, some trial and error is employed in establishing the proper feed rate for uniform microsphere formation. The sol-gel used is an aqueous colloidal solution or system wherein the solid material mixed and suspened therein is samarium hydroxide having a molar constituent varying from 1 to 4, for example. Other solid materials that have been used in the sol-gel solution to form microspheres include neodymia ($Nd_2O_3$), promethia ($Pm_2O_3$) and most of the rare earths.

FIG. 3 is a generally perspective view of another illustrative embodiment of the apparatus for practicing this invention. This embodiment utilizes an electric motor offset drive and can be appropriately designated as the electric motor microsphere production system 60. The system 60 includes a variable speed motor 62, a flywheel 64 suitably coupled centrally to the drive shaft 66 of the motor, a normally vertical sol-gel feed tube 68 rotatably mounted directly on an adjustable pivot point 70, and a connecting rod 72 attached at its left end to an off-center crankpin 74 on the flywheel and at its right end to the web 76 of a U-shaped bracket 78 rotatably attached on its arms 80 to an upper connection point 82 directly on the feed tube. The motor 62 can be either an alternating or direct current motor variable in speed from 3000 to 6000 r.p.m., for example.

The adjustable pivot point 70 can be set on the feed tube 68 by moving it in the clamp 84 and then tightening the clamp at a desired pivot point along the length of the feed tube. The clamp 84 has diametrically extending pivot pins 86 which are rotatably mounted and secured to respective arms 88 of U-shaped bracket 90. The web 92 of the bracket 90 is connected by a mounting rod 94 to fixed structure as indicated. A suitable sol-gel solution is fed to the upper end 96 of the feed tube 68 by an infusion pump and its syringe (not shown) in the same manner as that shown in FIG. 2. The lower end 98 of the feed tube 68 is, of course, also suitably immersed in a circulated alcohol drying column (not shown) in the same manner as that illustrated in FIG. 1. While four hollow, squared end, microsphere forming needles 100 are actually joined to and extend from the lower end 98 of the feed tube 68 is this particular embodiment of apparatus for practicing the invention, the number of needles that can be used is limited only by the size of the feed tube.

FIG. 4 is a fragmentary cross sectional view of the pivotally mounted sol-gel feed tube 68, as taken along the line 4—4 indicated in FIG. 3. In this cross sectional view, the connection point 82 is seen to be a diametrical line which is perpendicular to the arms 80 of the U-shaped bracket 78. The arms 80 are rotatably mounted and secured to respective attachment pins 102 which extend diametrically from a clamp 104. The clamp 104 is, of course, fastened to the feed tube 68 at the desired connection point 82 along the length thereof. The relative positions of the pivot and connection points 70 and 82 are chosen to provide a predetermined horizontal or lateral displacement of the ends of the needles 100 as indicated by the arrow 106 shown in FIG. 3. The actual movement of the ends of the needles 100 is, of course, along an arc which is centered on the pivot point 70. The vertical displacement, as contrasted with the horizontal displacement, of the ends of the needles 100 is, however, virtually imperceptible over the normal displacement range of travel (of the order of 1/16-inch) involved.

FIG. 5 is another cross sectional view of the pivotally mounted sol-gel feed tube 68, as taken along the line 5—5 indicated in FIG. 3. The lower end 98 (FIG. 3) of the feed tube 68 is generally flattened and tapered inwardly towards the needles 100. The upper ends of the needles are thus joined to a closed, narrow width, rectangular end of the feed tube 68. In this instance, the needles 100 are arranged in a row as shown in FIG. 5. While the needles 100 are vibrated laterally in the direction of the solid line arrow 106, they can also be suitably vibrated laterally in the direction of the broken line arrow 108 which is perpendicular to the solid line arrow. This can be easily accomplished by loosening the clamps 84 and 104 and rotating the feed tube 68 (FIG. 3) on its axis 90 degrees, and then tightening the clamps again. The needles 100 can, of course, be arranged in patterns or configurations other than a straight row as illustrated in FIGS. 3 and 5. Further, the needles 100 can, if desired, have different diameter bores to produce different sized microspheres simultaneously during a production run.

A fairly wide range of microsphere sizes can be produced with needles of a given bore diameter by varying their vibration frequency. Other ranges can be similarly obtained by using needles of larger or smaller bore diameters, of course. It should also be noted that the needles 100 (FIGS. 3 and 5) must be adequately spaced apart so that there is no interference in microsphere formation between adjacent needles. Using No. 22 needles, for example, the needles 100 are preferably spaced at approximately ⅛-inch intervals.

The operation with multiple feed needles 100 is similar to that (FIGS. 1 and 2) with a single feed needle 52, in that uniform microspheres are formed by a breaking action as the feed needles vibrate perpendicularly to the direction of sol-gel flow. The apparatus for practicing this invention can be built as a small scale, single needle, unit or as a large scale, multiple needle, unit which is feasible for production of microspheres in quantity. Alcohol feed used conventionally with sol-gel feed is eliminated in this invention, such that the usual fluctuating alcohol feed acting on the sol-gel feed is not present to affect the resulting microsphere size. The consequential variation in microsphere size is greatly reduced to a very small rejection rate. Illustratively, in a "worst embodiment" case, the yield from a 50 c.c. syringe supply of sol-gel exceeded 80% in the 600 micron size range for a permissible variation of ± 50 microns with a pneumatically vibrated seven-needle embodiment of the multiple needle version of the apparatus for practicing this invention. This pneumatically or air-actuated vibrator embodiment of apparatus for practicing the invention has not been shown herein because of the presently better performance and more precise control available from the electromagnetic transducer and electric motor microsphere production embodiments. The operations or processes performed by the exemplary, and delete [and process]; apparatus and process described above are unique in their concept to produce microspheres without the need for complicated control of simultaneous alcohol and sol-gel feeds required in the conventional apparatus and process. Microsphere production by (lateral) vibration eliminates the need for a simultaneous alcohol flow and assures a more homogeneous solution prior to microsphere formation, thereby greatly reducing any needle plugging due to variations in sol-gel consistency or viscosity; and by this very action produces uniformly sized spheres. The results include apparatus having a considerable simplification over the equipment conventionally required and vastly greater reliability in forming very accurately sized microspheres. The man-hours required in monitoring sol-gel microspheres production runs have been very significantly reduced with the apparatus for practicing this invention.

While certain exemplary embodiments of apparatus for practicing this invention and their operations or processes have been described above and shown in the accompanying drawings, it is to be understood that the operations or processes performed by such embodiments are merely illustrative of, and not restrictive on, the broad invention and that I do not desire to be limited in my invention to the specific processes, or operations or procedures shown and described, for obvious modifications may occur to persons skilled in the art.

I claim:

1. A process for producing microspheres, which comprises the steps of:
   immersing a lower portion of a generally vertical sol-gel feed tube comprising a lower end portion including a generally vertical microsphere formation nozzle in a column of drying liquid of predetermined viscosity, said nozzle being hollow and having an open bottom end;
   feeding a sol-gel solution at a predetermined rate into an upper end portion of said feed tube and axially out said bottom end of said nozzle, said drying liquid being a nonsolvent of said sol-gel; and
   vibrating said nozzle at a predetermined amplitude and frequency whereby said bottom end of said nozzle is displaced over a predetermined travel in a generally horizontal direction and said sol-gel being emitted in a generally vertical direction therefrom coacts functionally with said drying liquid in a breaking action to produce formed microspheres which are uniform in size and at least partially dried in falling through said column.

2. The invention as defined in claim 1 further comprising the step of circulating said drying liquid in said column to provide an upward flow of drying liquid at a predetermined flow rate for suspending a quantity of said formed microspheres therein until an adequate drying time has elapsed.

3. The invention as defined in claim 1 wherein said feed tube comprises a lower end portion including multiple, generally vertical, microsphere formation nozzles arranged in a spaced pattern whereby vibrating said nozzles to displace them over a predetermined travel in a generally horizontal direction can produce formed microspheres from said feed tube in quantity.

4. The invention as defined in claim 3 further comprising the step of circulating said drying liquid in said column to provide an upward flow or drying liquid at a predetermined flow rate for suspending a quantity of said formed microspheres therein until an adequate drying time has elapsed.

5. A process for producing high yields of microspheres of a very uniform and predetermined size, which comprises the steps of:
freely supporting a generally vertical sol-gel feed tube on one end of a connecting element, the other end of said element being connected to an electrical drive device which can be electrically energized to reciprocate said feed tube laterally at a predetermined amplitude and frequency, and said feed tube comprising a lower end portion including a generally vertical microsphere formation nozzle having a bottom end of a predetermined hollow cross sectional open area;
immersing a lower portion of said feed tube in a column of drying liquid of predetermined viscosity;
feeding a sol-gel solution at a predetermined rate into an upper end portion of said feed tube and axially out said bottom end of said nozzle, said drying liquid being a nonsolvent of said sol-gel;
energizing said drive device with an electrical signal to reciprocate said feed tube laterally whereby said nozzle is reciprocally displaced over a predetermined travel in a generally horizontal direction and said sol-gel being emitted in a generally vertical direction from said bottom end of said nozzle coacts functionally with said drying liquid in a breaking action to produce formed microspheres therefrom of a predetermined size according to said hollow cross sectional open area of said nozzle and its horizontal reciprocation amplitude and frequency; and
circulating said drying liquid in said column to provide an upward flow of drying liquid at a predetermined flow rate for suspending a quantity of said formed microspheres therein until an adequate drying time has elapsed.

6. The invention as defined in claim 5 wherein said drive device is responsive in reciprocation frequency according to the frequency of said electrical signal, and further comprising the step of varying said frequency of said electrical signal and hence similarly of said feed tube nozzle whereby microsphere size is essentially a function of said nozzle reciprocation frequency alone and said nozzle of the same said predetermined hollow cross sectional open area can be used without altering its reciprocation amplitude for production runs of different sizes of microspheres.

7. A process for producing high yields of microspheres of a very uniform and predetermined size, which comprises the steps of:
pivotally mounting a sol-gel feed tube directly on a longitudinal pivot point in a normally vertical position, said feed tube being freely rotatable and solely supported on said pivot point, and said feed tube comprising a lower end portion including a normally vertical microsphere formation nozzle having a bottom end of a predetermined hollow cross sectional open area;
immersing a lower portion of said feed tube in a column of drying liquid of predetermined viscosity;
feeding a sol-gel solution at a predetermined rate into an upper end portion of said feed tube and axially out said bottom end of said nozzle, said drying liquid being a nonsolvent of said sol-gel; and
oscillating a drive point directly on said feed tube above its pivot point through reciprocating drive means to oscillate said feed tube independently on said pivot point, said feed tube being thereby oscillated at a predetermined amplitude and frequency whereby said nozzle is reciprocally displaced over a predetermined travel in a generally horizontal direction, with minor travel in a generally vertical direction, and said sol-gel being emitted in a generally vertical direction from said bottom end of said nozzle coacts functionally with said drying liquid in a breaking action to produce formed microspheres therefrom of a predetermined size according to said hollow cross sectional open area of said nozzle and its horizontal reciprocation amplitude and frequency, and which are uniform in size and at least partially dried in falling through said column.

8. The invention as defined in claim 7 further comprising the step of circulating said drying liquid in said column to provide an upward flow of drying liquid at a predetermined flow rate for suspending a quantity of said formed microspheres therein until an adequate drying time has elapsed.

9. The invention as defined in claim 8 further comprising the step of varying the reciprocation frequency of said drive means and hence similarly of said feed tube nozzle whereby microsphere size is essentially a function of said nozzle reciprocation frequency alone and said nozzle of the same said predetermined hollow cross sectional open area can be used without altering its reciprocation amplitude for production runs of different sizes of microspheres.

* * * * *